US012459659B2

(12) United States Patent
Cafaro et al.

(10) Patent No.: US 12,459,659 B2
(45) Date of Patent: Nov. 4, 2025

(54) METHOD AND APPARATUS FOR CONTROLLING ELECTRICAL MACHINES OPERATING WITH A TURBINE ENGINE

(71) Applicant: General Electric Company, Schenectady, NY (US)

(72) Inventors: Stefan Joseph Cafaro, Chapel Hill, NC (US); Brendon Leeker, Cincinnati, OH (US); Kevin Graziano, Liberty Township, OH (US); Harry Kirk Mathews, Jr., Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/687,832

(22) Filed: Mar. 7, 2022

(65) Prior Publication Data

US 2023/0278719 A1 Sep. 7, 2023

(51) Int. Cl.
| | |
|---|---|
| B64D 31/06 | (2024.01) |
| B64D 27/33 | (2024.01) |
| B64D 31/18 | (2024.01) |
| B64D 35/021 | (2024.01) |
| B64D 35/023 | (2024.01) |
| B64D 35/024 | (2024.01) |

(52) U.S. Cl.
CPC ............ *B64D 31/06* (2013.01); *B64D 27/33* (2024.01); *B64D 31/18* (2024.01); *B64D 35/021* (2024.01); *B64D 35/023* (2024.01); *B64D 35/024* (2024.01)

(58) Field of Classification Search
None
See application file for complete search history.

(56) References Cited

U.S. PATENT DOCUMENTS

| | | | |
|---|---|---|---|
| 3,686,485 | A | 8/1972 | Wiley |
| 3,750,782 | A | 8/1973 | Costantini |
| 4,425,614 | A | 1/1984 | Barron |
| 5,915,917 | A | 6/1999 | Eveker |
| 6,010,303 | A | 1/2000 | Feulner |

(Continued)

FOREIGN PATENT DOCUMENTS

| | | |
|---|---|---|
| CN | 103835881 | 6/2014 |
| CN | 103850802 B | 4/2016 |

(Continued)

OTHER PUBLICATIONS

U.S. Appl. No. 17/942,525; Restriction Requirement mailed Sep. 13, 2023; (pp. 6).

(Continued)

*Primary Examiner* — Gerald L Sung
*Assistant Examiner* — Jacek Lisowski
(74) *Attorney, Agent, or Firm* — Smith Gambrell & Rusell LLP

(57) ABSTRACT

A first electrical machine is operated according to a first mode and a second electrical machine is operated according to a second mode. A power split of operation of the first electrical machine and the second electrical machine is determined. The operation of the first electrical machine and the second electrical machine are controlled according to the power split. The power split is optimized to protect operating constraints of the components of the engine and the aircraft while delivering required thrust to the aircraft.

18 Claims, 7 Drawing Sheets

(56) References Cited

U.S. PATENT DOCUMENTS

| | | | |
|---|---|---|---|
| 6,059,522 | A | 5/2000 | Gertz |
| 6,979,979 | B2 | 12/2005 | Xu |
| 7,011,498 | B2 | 3/2006 | Vos |
| 8,036,805 | B2 | 10/2011 | Mahoney et al. |
| 8,825,227 | B2 | 9/2014 | Saint-Marc et al. |
| 8,866,318 | B2 | 10/2014 | Langford |
| 9,109,538 | B2 | 8/2015 | Maalioune |
| 9,257,838 | B2 | 2/2016 | Gataric et al. |
| 9,267,438 | B2 | 2/2016 | Dooley |
| 9,327,600 | B1 | 5/2016 | Nehmeh |
| 9,428,267 | B2 | 8/2016 | Devita |
| 9,441,547 | B2 | 9/2016 | Cai |
| 9,533,636 | B2 | 1/2017 | Brouwer et al. |
| 9,561,860 | B2 | 2/2017 | Knapp |
| 9,630,510 | B2 | 4/2017 | Sukumaran |
| 9,643,729 | B2 | 5/2017 | Walter-Robinson |
| 9,688,414 | B2 | 6/2017 | Burns et al. |
| 9,828,917 | B2 | 11/2017 | Klonowski |
| 9,889,746 | B2 | 2/2018 | Wolff |
| 10,023,319 | B2 | 7/2018 | Teicholz |
| 10,260,471 | B2 | 4/2019 | Huang |
| 10,308,353 | B2 | 6/2019 | Swann |
| 10,392,119 | B2 | 8/2019 | Niergarth |
| 10,435,165 | B2 | 10/2019 | Swann |
| 10,436,059 | B2 | 10/2019 | Liu |
| 10,442,547 | B2 | 10/2019 | Miller |
| 10,450,886 | B2 | 10/2019 | Sennoun |
| 10,569,759 | B2 | 2/2020 | Gansler |
| 10,583,931 | B2 | 3/2020 | Cline |
| 10,644,630 | B2 | 5/2020 | Smith |
| 10,676,199 | B2 | 6/2020 | Hon |
| 10,711,693 | B2 | 7/2020 | Miller |
| 10,737,798 | B2 | 8/2020 | Misfeldt |
| 10,906,634 | B2 | 2/2021 | Rhoden et al. |
| 11,007,955 | B2 | 5/2021 | Klemen |
| 11,725,594 | B2 | 8/2023 | McQuiston |
| 12,006,880 | B2 | 6/2024 | Mathews, Jr. |
| 2003/0115883 | A1 | 6/2003 | Myers |
| 2005/0225303 | A1 | 10/2005 | Xu |
| 2006/0225431 | A1 | 10/2006 | Kupratis |
| 2010/0138089 | A1 | 6/2010 | James |
| 2013/0086919 | A1 | 4/2013 | Dooley |
| 2013/0247579 | A1 | 9/2013 | Morawski |
| 2014/0216047 | A1 | 8/2014 | Morisaki |
| 2014/0271114 | A1* | 9/2014 | Phillips ............. G05B 19/048 415/118 |
| 2015/0321752 | A1 | 11/2015 | Trull |
| 2016/0325826 | A1 | 11/2016 | Swann |
| 2017/0044989 | A1 | 2/2017 | Gemin |
| 2017/0057650 | A1 | 3/2017 | Walter-Robinson |
| 2017/0175565 | A1 | 6/2017 | Sennoun |
| 2017/0187311 | A1* | 6/2017 | French ............. B81C 1/00158 |
| 2017/0226933 | A1 | 8/2017 | Klonowski |
| 2017/0248080 | A1 | 8/2017 | Chevalier |
| 2017/0324360 | A1* | 11/2017 | Cline ............. B64D 27/24 |
| 2017/0335710 | A1 | 11/2017 | Klemen |
| 2017/0342855 | A1 | 11/2017 | Hon |
| 2018/0050807 | A1 | 2/2018 | Kupiszewski |
| 2018/0065755 | A1 | 3/2018 | Teicholz |
| 2018/0073437 | A1 | 3/2018 | Simonetti |
| 2018/0128182 | A1 | 5/2018 | Hayama |
| 2018/0141674 | A1 | 5/2018 | Bailey |
| 2018/0163514 | A1* | 6/2018 | Guven ............. E21B 21/12 |
| 2018/0187604 | A1 | 7/2018 | Poumarede |
| 2018/0194483 | A1 | 7/2018 | Schwöller |
| 2018/0319283 | A1 | 11/2018 | Battin |
| 2018/0354631 | A1 | 12/2018 | Adibhatla |
| 2018/0354632 | A1 | 12/2018 | Hon |
| 2018/0363564 | A1 | 12/2018 | Geneste |
| 2018/0370646 | A1 | 12/2018 | Hon |
| 2019/0001955 | A1 | 1/2019 | Gansler |
| 2019/0003398 | A1 | 1/2019 | Gibson et al. |
| 2019/0136768 | A1 | 5/2019 | Harvey |
| 2019/0165708 | A1 | 5/2019 | Smith |
| 2019/0186284 | A1 | 6/2019 | Orkiszewski |
| 2019/0233125 | A1* | 8/2019 | Knight ............. F16H 3/08 |
| 2019/0264617 | A1 | 8/2019 | Barmichev |
| 2019/0323426 | A1 | 10/2019 | Mackin |
| 2019/0345837 | A1 | 11/2019 | Bacic |
| 2019/0375512 | A1 | 12/2019 | Ribeiro |
| 2020/0010205 | A1 | 1/2020 | Swann |
| 2020/0056546 | A1 | 2/2020 | Terwilliger |
| 2020/0056551 | A1 | 2/2020 | Epstein |
| 2020/0079513 | A1 | 3/2020 | Pastouchenko |
| 2020/0095939 | A1 | 3/2020 | Epstein |
| 2020/0182158 | A1 | 6/2020 | Kupratis |
| 2020/0248619 | A1 | 8/2020 | Romero |
| 2020/0284265 | A1 | 9/2020 | Reepmeyer |
| 2020/0361611 | A1* | 11/2020 | Klemen ............. B64D 13/08 |
| 2020/0392906 | A1 | 12/2020 | Turner |
| 2021/0025339 | A1 | 1/2021 | Terwilliger |
| 2021/0047970 | A1* | 2/2021 | Collopy ............. F02C 6/00 |
| 2021/0108569 | A1 | 4/2021 | Lewis |
| 2022/0042465 | A1 | 2/2022 | Swann |
| 2022/0063824 | A1 | 3/2022 | Hiett |
| 2022/0063826 | A1 | 3/2022 | Hiett |
| 2022/0065177 | A1 | 3/2022 | McQuiston |
| 2023/0313744 | A1 | 10/2023 | Wang |
| 2024/0084740 | A1 | 3/2024 | Mathews, Jr. |
| 2024/0287943 | A1 | 8/2024 | Mathews, Jr. |

FOREIGN PATENT DOCUMENTS

| | | |
|---|---|---|
| EP | 3770399 | 1/2021 |
| FR | 3127024 | 3/2023 |
| FR | 3127025 | 3/2023 |
| FR | 3127269 | 3/2023 |
| FR | 3129375 | 5/2023 |
| FR | 3129432 | 5/2023 |
| FR | 3130313 | 6/2023 |
| FR | 3130323 | 6/2023 |
| FR | 3130875 | 6/2023 |
| FR | 3130877 | 6/2023 |
| FR | 3130879 | 6/2023 |
| FR | 3130894 | 6/2023 |
| FR | 3130896 | 6/2023 |
| FR | 3130897 | 6/2023 |
| FR | 3132743 | 8/2023 |
| JP | 5923515 | 5/2016 |
| KR | 20040018612 A | 3/2004 |
| WO | 2008049426 | 5/2008 |
| WO | 2008085535 | 7/2008 |
| WO | 2014085236 | 6/2014 |
| WO | 2015092269 | 6/2015 |

OTHER PUBLICATIONS

Budharaju Balaji, N Om Prakash Raj, Mahesh P Padwale, GP Ravishankar, "Modelling, Analysis and Flight Testing of a Military Turbofan Engine Under Windmilling Conditions", Dec. 5-6, 2019, ASME, GTINDIA2019-2353, pp. 1-5. (Year: 2019).

https://www.radioworld.com/news-and-business/the-abcs-of-swr-vswr-reflected-power-and-return-loss; The ABCs of SWR, VSR, Reflected Power and Return Loss; Mike Hendrickson; Dec. 9, 2015; (14 pgs.).

Rachakonda, Anil, et al., "Log amps and directional couplers enable VSWR detection", www.rfdesign.com, Jan. 2007, p. 28-34.

Understanding Cable and Antenna Analysis—https://www.anritsu.com/en-us/test-measurement/solutions/en-us/understanding-cable-and-antenna-analysis.

U.S. Appl. No. 17/942,525; Application filed Sep. 12, 2022, entitled "High Bandwidth Control of Turbofan/Turboprop Thrust Response Using Embedded Electric Machines".

U.S. Appl. No. 17/942,525; Non-Final Action mailed Nov. 7, 2023; (pp. 10).

U.S. Appl. No. 17/942,525; Restriction Requirement Action mailed Sep. 13, 2023; (pp. 6).

U.S. Appl. No. 17/168,725; Non-Final Rejection mailed Nov. 22, 2023; (pp. 1-22).

U.S. Appl. No. 17/942,525; Notice of Allowance and Fees Due (PTOL-85) mailed Mar. 4, 2024; (pp. 1-8).

(56) References Cited

OTHER PUBLICATIONS

U.S. Appl. No. 18/657,325; Non-Final Rejection mailed Oct. 21, 2024; (pp. 1-7).
U.S. Appl. No. 17/168,725; Final Rejection mailed Jul. 24, 2024; (pp. 1-26).

* cited by examiner

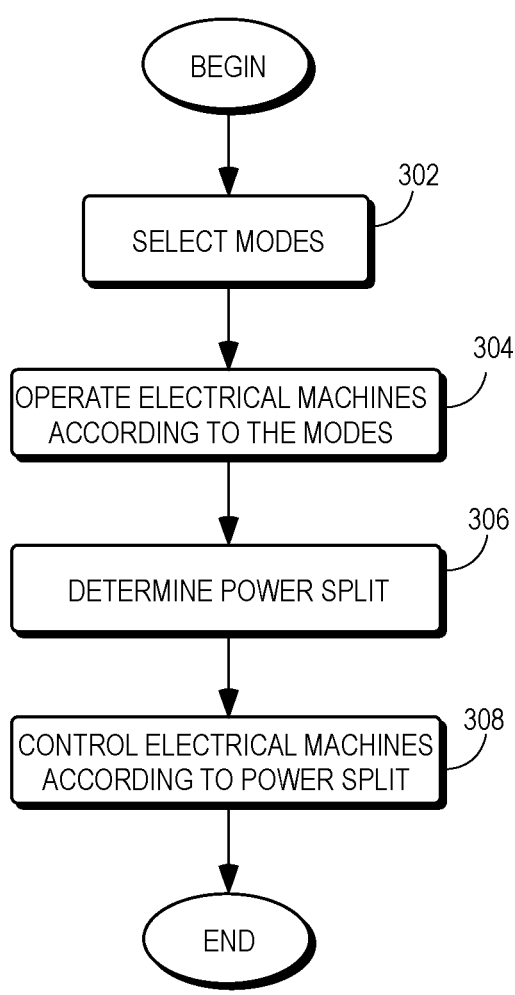

METHOD AND APPARATUS FOR CONTROLLING ELECTRICAL MACHINES OPERATING WITH A TURBINE ENGINE

TECHNICAL FIELD

These teachings relate generally to turbine engines and more particularly to controlling the operation of components associated with turbine engines.

BACKGROUND

Aircraft engines are typically coupled to electrical machines (e.g., motor generators) that provide power to the engine and/or take power from the engine to operate electrical devices in the aircraft. The efficient operation of these devices allows the aircraft to operate properly, for example, by providing adequate thrust at takeoff of the aircraft and also maintaining adequate electrical power for the operation of internal electrical systems of the aircraft at all times.

BRIEF DESCRIPTION OF THE DRAWINGS

Various needs are at least partially met through provision of the method and apparatus for managing the operation of electrical machines in a turbine engine described in the following detailed description, particularly when studied in conjunction with the drawings. A full and enabling disclosure of the aspects of the present description, including the best mode thereof, directed to one of ordinary skill in the art, is set forth in the specification, which refers to the appended figures, in which:

FIG. 3 comprises a flowchart as configured in accordance with various embodiments of these teachings;

Figure 1:
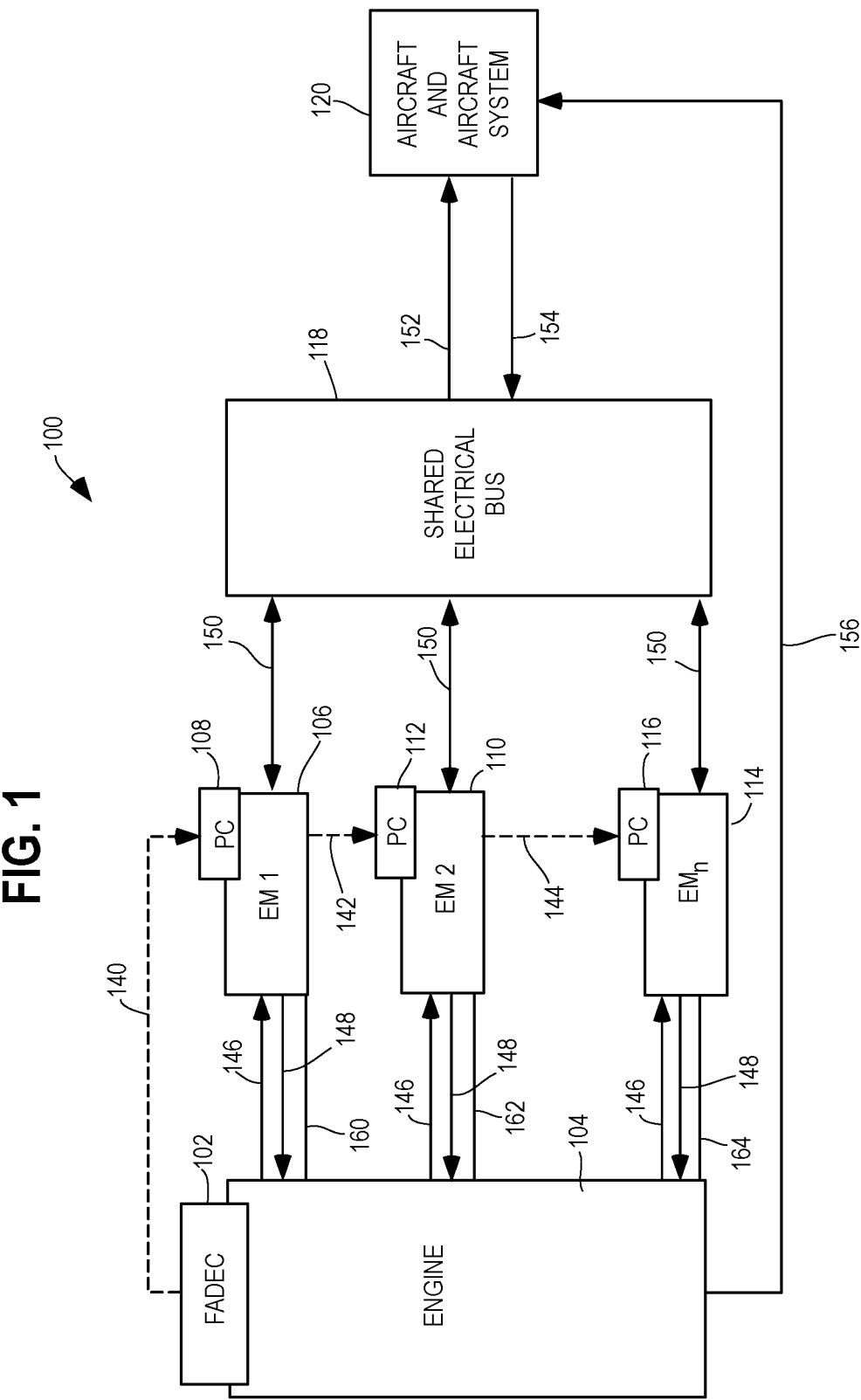
FIG. 1 comprises a diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Next-generation turbofan and turboprop aircraft engines have a significant increase in required power generation capability. The approaches described herein provide electrified propulsion systems with multi-engine and multi-spool (shaft) power extraction as well as the ability to transfer power from one spool to another. Such electric architectures may or may not include an additional energy storage device to receive or provide electrical power.

The approaches presented herein provide a control methodology for managing the interactions between the engine thrust control and the electrical machine control. In certain aspects, these approaches utilize an array of electric machines applied to various independent main engine spools or shafts to optimize engine cycle performance while meeting aircraft electrical power demands. Since the control methodology considers a multiple array of electrical machines attached to independent engine shafts from an engine system level, electrical power can be extracted from one main shaft (e.g., operate as a generator) and applied as mechanical power to another main shaft (e.g., operating as a motor). Thus, the approaches provided herein are agnostic to electric architectures that choose to have an integrated battery or other external power source.

Advantageously, the deterministic torque/power scheduling also allows for a feed-forward disturbance rejection integrated with the primary engine control for tighter thrust holding. These approaches meet the increasing electric power consumption demands of the engine and the aircraft while minimizing impact to primary control of the engine. Further, these approaches provide deterministic power transfer and power split scheduling for better propulsion system efficiency. The approaches provided herein provide improved transient capability and operability by integrating engine and electric machine power management. The present approaches improve time on the wing of the engine due to reducing cycle temperature and improve thrust control due to disturbance rejection logic of electrical power demands.

The present approaches additionally provide direct-feedback available for thrust control integration, and local supervisor level optimization. These approaches are agnostic to aircraft electric machine (EM) architecture (e.g., battery vs no battery or external energy source or sink).

In many of these embodiments, an approach for operating electrical machine associated with an aircraft engine includes determining a first mode to operate a first electrical machine and a second mode to operate a second electrical machine, the first electrical machine coupled to a first shaft of an engine and the second electrical machine coupled to a second shaft of an engine. The first electrical machine is operated according to the first mode and the second electrical machine is operated according to the second mode. A power split of operation of the first electrical machine and the second electrical machine is determined. The operation of the first electrical machine and the second electrical machine are controlled according to the power split. The power split is optimized to protect operating constraints of the engine and the safety of aircraft components while delivering required thrust to the engine.

In aspects, the first engine shaft supplies mechanical power to the first electrical machine operating in the first mode and electrical power is supplied to the aircraft and to the second electrical machine on the second shaft of the engine. In other aspects, the second mode comprises a torque mode in which the second electrical machine supplies power to the engine. In other examples, determining the power split of operation utilizes a table.

In other examples, operating conditions of the aircraft are applied to the table to obtain the power split of operation. In still other examples, the power split of operation is determined.

In still other aspects, the first mode and the second mode are selected based on characteristics of the first electrical machine and the second electrical machine. For example, the first mode and second mode may be selected on characteristics such as machine size or operating speed.

In other examples, the aircraft components comprise aircraft instruments such as environmental systems and communication systems.

In some other examples, the required thrust is received from a cockpit system operated by a pilot or from an aircraft management system (AMS). For instance, the pilot my operate a lever to indicate the desired thrust.

In yet other examples, the first electrical machine and the second electrical machine are operated so as to produce stepwise and gradual changes. For example, the amount of torque or electrical power may be increased or decreased gradually rather than according to large steps.

In others of these embodiments, a system comprises a first electrical machine coupled to a first shaft of an engine of an aircraft; a second electrical machine coupled to a second shaft of the engine of the aircraft; and a controller coupled to the first electrical machine and the second electrical machine. The controller is configured to: determine a first mode to operate the first electrical machine and a second mode to operate the second electrical machine, and operate the first electrical machine according to the first mode and the second electrical machine according to the second mode; determine a power split of operation of the first electrical machine and the second electrical machine; and control the operation of the first electrical machine and the second electrical machine according to the power split, the power split being optimized to protect operating constraints of the engine and the safety of aircraft components while delivering required thrust to the engine.

The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

The foregoing and other benefits may become clearer upon making a thorough review and study of the following detailed description.

Referring now to FIG. 1, one example of a system 100 for controlling electrical devices in a turbine engine is described. The system 100 includes a controller (e.g., full authority digital engine control (FADEC) controller) 102, an aircraft engine 104, a first electrical machine 106 with a first power converter 108, a second electrical machine 110 with a second power converter 112, an nth electrical machine 114 with an nth power converter 116, a shared electrical bus 118, and aircraft (and aircraft systems) 120. "N" is an integer numbers and, in many of the examples described herein, N=2.

The controller 102 is coupled to the first power converter 108, the second power converter 112 and the nth power converter 116. It will be appreciated that, as used herein, the term "controller" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The controller 102 may be configured (for example, by using corresponding programming stored in a memory as will be well understood by those skilled in the art) to carry out one or more of the steps, actions, and/or functions described herein. The controller 102 may include a memory that includes computer instructions that implement any of the functions described herein.

The aircraft engine 104 includes various components of an aircraft engine. For example, the aircraft engine includes shafts a compressor section, a combustion section, and a turbine section. Separate mechanical shafts (or spools) 160, 162, and 164 couple to components in these sections. The separate mechanical shafts 160, 162, and 164 are also mechanically coupled to the first electrical machine 106, the second electrical machine 110, and the nth electrical machine 114. The separate mechanical shafts 160, 162, and 164 supply torque to the aircraft engine 104 when a particular electrical machine operates in torque mode. The separate mechanical shafts 160, 162, and 164 supply torque from the aircraft engine 104 to a particular electrical machine when the electrical machine operates in voltage mode.

The first electrical machine 106, the second electrical machine 110, and the nth electrical machine 114 are motor and/or generator devices. In some aspects of operation these devices operate as motors, that is, the devices operate in a torque mode and provide torque to the aircraft engine 104. In other examples, the devices operate as electric generators and provide electrical power to the shared electrical bus 118. The first electrical machine is coupled to a first shaft of an engine and the second electrical machine is coupled to a second shaft of an engine, for example.

The first power converter 108, the second power converter 112, and nth power converter 116 are configured by the controller 102 to cause their associated electrical machines 106, 110, and 114 operate in different modes and according to different operating parameters. For example, the controller 102 instructs the first power converter 108, the second power converter 112, or the nth power converter 116 to operate in voltage mode or torque mode. Voltage mode is typically assigned to the electric machine with the greatest capacity for holding electrical bus voltage and supplies electrical energy from the aircraft engine 104 to the shared electrical bus 118. Torque mode is typically assigned to the electric machine (and associated shaft) where it is most beneficial for the controller 102 to directly schedule and supplies energy to the aircraft engine 104 from a particular electrical machine.

The first power converter 108, the second power converter 112, and nth power converter 116 comprise electrical and/or electronic components that operate associated electrical machines 106, 110, and 114 according to different modes of operations. These components may be analog or digital components and may include controllers (e.g., microprocessors). The controller 102 configures (e.g., sets, sends instructions, or otherwise alters) these components so that the electrical machines 106, 110, and 114 operate in the selected mode.

The shared electrical bus 118 comprises wires, buses, cables, or other connections that transmit power from one location to another location. The shared electrical bus 118 may also include transmission components such as transistors, resistors, capacitors, switches, repeaters, or other electrical or electronic components that facilitate the transmission of holding of electrical power.

The aircraft (and aircraft systems) 120 may include the aircraft itself, other engines, and aircraft systems and components such as batteries, de-icing systems, communication systems, lighting systems, environmental systems to mention a few examples that use or consume or hold electrical power.

In one example of the operation of the system of FIG. 1, at step 140, the controller 102 configures the first power converter 108 to hold a shared electrical bus voltage on the shared electrical bus 118 using the first electrical machine 106. At step 142, the controller 102 configures the second power converter 112 to generate a controller-commanded torque to the aircraft engine 104 using the second electrical machine 110. At step 144, the controller 102 configures the nth power converter 116 to generate or otherwise create or produce a controller-commanded torque to the aircraft engine 104 using the nth electrical machine 114.

Connections 146 from the aircraft engine 104 to the first electrical machine 106, the second electrical machine 110, or the nth electrical machine 114 represent power extracted from the corresponding separate mechanical shafts 160, 162, and 164 of the aircraft engine 104 that is used to generate electrical power when the first electrical machine 106, the second electrical machine 110, or the nth electrical machine 114 are operated in voltage mode. In this specific example, the first electrical machine 106 is operated in voltage mode.

Connections 148 from the first electrical machine 106, the second electrical machine 110, or the nth electrical machine 114 to the aircraft engine 104 represent power injected into the corresponding separate mechanical shafts 160, 162, and 164 into the aircraft engine 104 when the first electrical machine 106, the second electrical machine 110, or the nth electrical machine 114 are operated in torque mode. In this specific example, the second electrical machine 110 and the nth electrical machine 114 are operated in torque mode and N=3.

Connections 150 between the first electrical machine 106, the second electrical machine 110, or the nth electrical machine 114 and the shared electrical bus represent electrical power delivered to or extracted from the shared electrical bus 118. Connection 152 represents the aircraft (and aircraft systems) 120 drawing power from the shared electrical bus 118. Connection 154 represents the aircraft (and aircraft systems) 120 providing power to the shared electrical bus 118 (which may couple to a battery or another engine). Connection 156 represents the thrust delivered by the aircraft engine 104 to the aircraft (and aircraft systems) 120.

In another example of the operation of FIG. 1 and assuming only two electrical machines (N=2), the controller 102 determines a first mode (e.g., voltage mode) to operate the first electrical machine 106 and a second mode (e.g., torque mode) to operate the second electrical machine 110. The first electrical machine 106 is operated according to the first mode and the second electrical machine 110 is operated according to the second mode using the first power converter 108 and the second power converter 112, respectively. A power split of operation of the first electrical machine 106 and the second electrical machine 110 is determined. The operation of the first electrical machine 106 and the second electrical machine 110 are controlled by the first power converter 108 and the second power converter 112 as instructed by the controller 102 according to the power split. The power split is optimized by the controller 102 to protect operating constraints of the engine and the safety of aircraft components while delivering required thrust to the engine.

The power split specifies the total power to be maintained at the shared electrical bus 118 and how much is to be supplied or drawn by each of the electrical machines 106 and 110. The power split dynamically changes over time. For instance, if one electrical machine draws more power from the shared electrical bus 118 to supply this power to the engine during takeoff, the other electrical machine compensates by providing more electrical power to the shared electrical bus 118 so that the amount of power at the shared electrical bus 118 stays constant or substantially constant. The controller 102 issues appropriate commands as needed to the first electrical machine 106 and the second electrical machine 110 to effect these operations. These commands may include the mode that an electrical machine is to operate but also amounts of torque or electrical energy that are needed.

It will be appreciated that the power converters/electrical machines may be operated in different modes. In a first example, one power converter/electrical machine is a leader and the other is a follower. To take one example, the first power converter 108 is operated in torque mode (as a leader). The second power converter 112 is operated in voltage mode (as a follower). Constraints (e.g., constraints related to an electrical machine or the aircraft engine 104, etc.) are mapped to the first electrical machine 106 via commands generated by the controller 102, and the first electrical machine 106 becomes the leader in producing torque. The second power converter is a follower power converter and regulates a bus voltage on the shared electrical bus 118 as alternating current (AC) load varies on the shared electrical bus 118. The AC load may vary, in examples, based upon the number and type of aircraft systems being powered.

In another example, both the first power converter 108 and the second power converter 112 operate in voltage mode.

In still another example, both the first power converter 108 and the second power converter 112 operate in torque mode. A battery and/or AC supply may be used to supply power to the shared electrical bus 118.

Figure 2A:
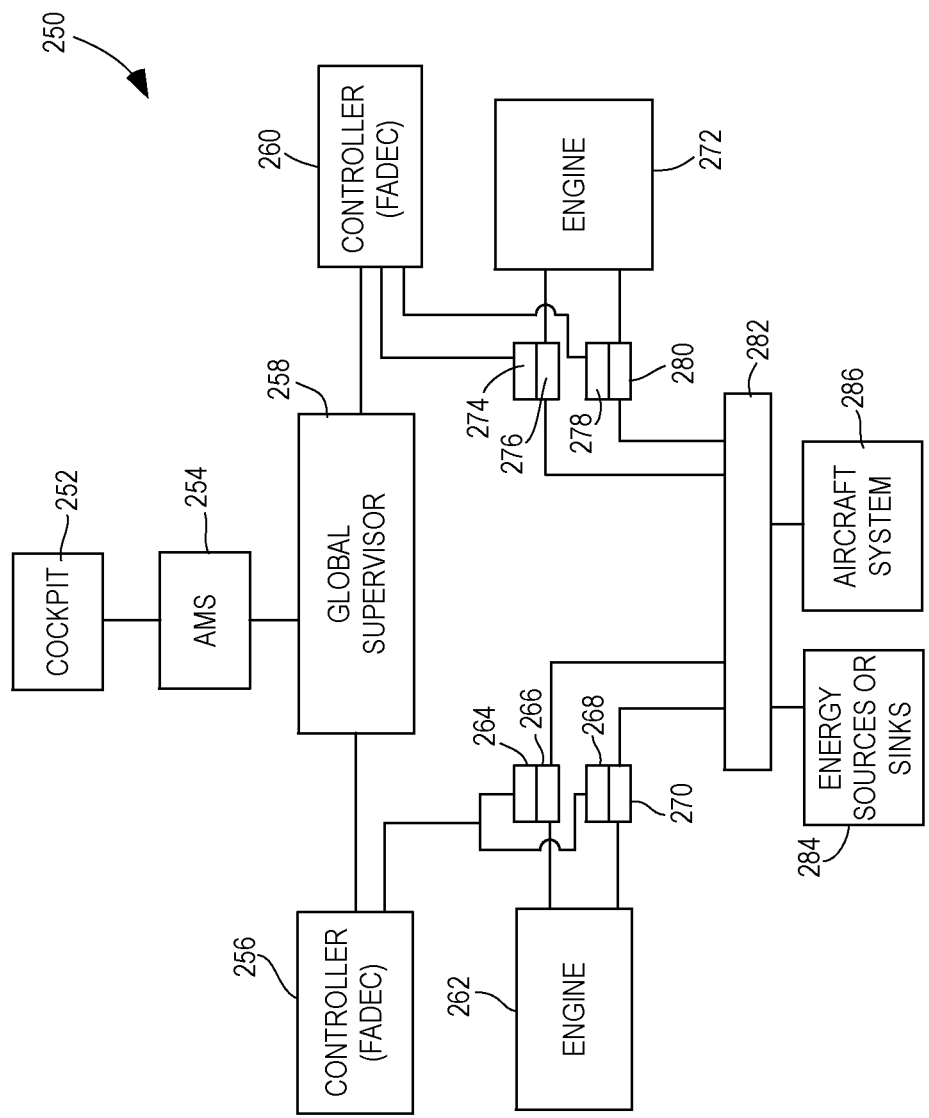
FIG. 2A comprises a diagram as configured in accordance with various embodiments of these teachings.

Referring to FIG. 2A, one example of a system 250 for controlling electrical devices in a turbine engine is described. It will be appreciated that this system shows an aircraft with two engines. The system includes a cockpit 252, an aircraft management system (AMS) 254, a global supervisor 258, a first controller (e.g., a FADEC controller) 256, a second controller (e.g., a FADEC controller) 260, a first engine 262, a first power converter 264, a first electrical machine 266, a second power converter 268, a second electrical machine 270, a second engine 272, a third power converter 274, a third electrical machine 276, a fourth power converter 278, a fourth electrical machine 280, a shared electrical bus 282, energy sources or sinks 284, and aircraft systems 286. The first controller (e.g., a FADEC controller) 256 is coupled to the first engine 262 to control the engine cycle of the first engine 262. The second controller (e.g., a FADEC controller) 260 is coupled to the second engine 272 to control the engine cycle of the second engine 272.

The cockpit 252 is where the pilot and other aircraft personnel are located and actuate levers, buttons, or other controls to operate the aircraft. These controls are coupled to the AMS 254, which may include computers or electronic devices that accept controls and pass these to the global supervisor 258. The global supervisor may be a controller and operates to determine, for example, how much thrust the first engine 262 will provide as compared to the second engine 272. The operation and functionality of the first controller (e.g., a FADEC controller) 256, the second controller (e.g., a FADEC controller) 260, the first engine 262, the first power converter 264, the first electrical machine 266, the second power converter 268, the second electrical machine 270, the second engine 272, the third power converter 274, the third electrical machine 276, the fourth power converter 278, and the fourth electrical machine 280 are the same as similarly-named elements with respect to FIG. 1 and will not be repeated here. The first electrical machine 266, the second electrical machine 270, the third electrical machine 276, and the fourth electrical machine 280 couple to the shared electrical bus 282 which is similar to the shared electrical bus described with respect to FIG. 1. The shared electrical bus 282 couples to energy sources or sinks 284 and aircraft systems 286. Energy sources or sinks 284 may include batteries or other generators. Aircraft systems 286 may include internal aircraft systems that require electrical power such a lighting systems, air conditioning systems, or communication systems to mention a few examples.

Figure 2B:
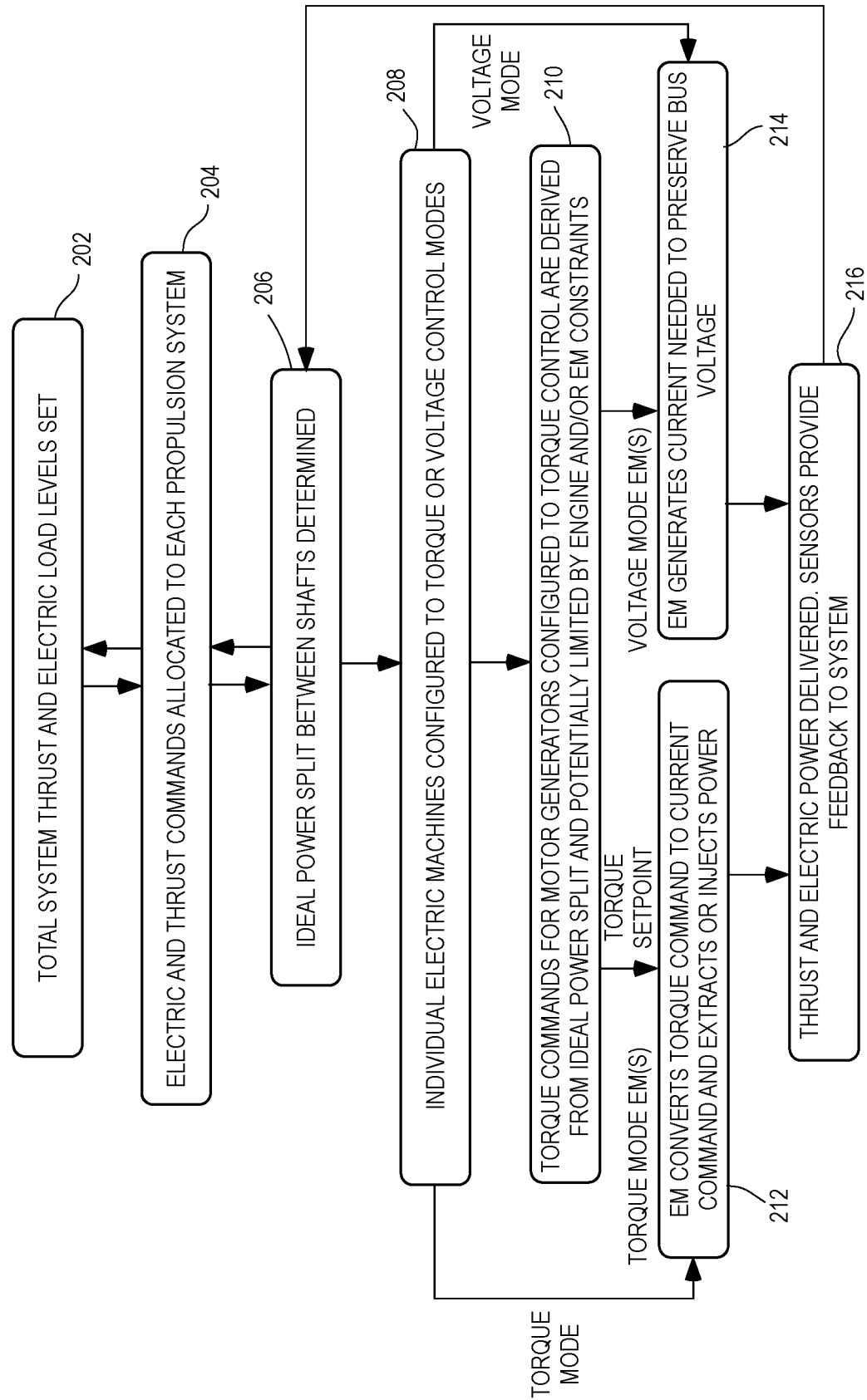
FIG. 2B comprises a flowchart as configured in accordance with various embodiments of these teachings.

Referring now FIG. 2B, at step 202 the total system thrust and electrical load levels are set by the aircraft. For example, the pilot in the cockpit 252 pushes a lever to indicate a thrust desired. In other examples, the thrust may be set automatically. The AMS 254 converts this into electronic commands, which are sent to the global supervisor 258.

At step 204, electric and thrust commands are allocated to each propulsion system by the global supervisor. The global supervisor determines how much of the power is to be provided by each of the first engine 262 and the second engine 272.

At step 206, the ideal or preferred split between the shafts is determined by the first controller (e.g., a FADEC controller) 256 for the first engine 262 and by the second controller (e.g., a FADEC controller) 260 for the second engine 272.

At step 208, individual electrical machines (the first electrical machine 266, the second electrical machine 270, the third electrical machine 276, and the fourth electrical machine 280) are set to torque mode or voltage mode by the first controller (e.g., a FADEC controller) 256 and the second controller (e.g., a FADEC controller) 260.

At step 210, the first controller (e.g., a FADEC controller) 256 and the second controller (e.g., a FADEC controller) 260 determine torque set points for their respective electrical machines (the first electrical machine 266, the second electrical machine 270, the third electrical machine 276, and the fourth electrical machine 280) if the electrical machine is being operated in torque mode. The power converters are configured to operate the electrical machines for torque control from the ideal power split and their operation is potentially limited by engine and/or electric machine constraints.

At step 212, for electrical machines operating in torque mode, the electrical machine converts the torque commands to electrical current commands and extracts power from the first engine 262 or second engine 272 and/or injects power into the first engine 262 or second engine 272. For example, the conversion may involve converting a torque command from a digital format to an analog (e.g., electrical current) format. The electrical current may be used to actuate portions of the electrical machine to supply torque to the first engine 262 or the second engine 272.

At step 214, for electrical machines operating in voltage mode, the electrical machine generates the current to preserve the voltage on the shared electrical bus 282. For example, electrical machines operating in voltage mode may supply power to the aircraft systems 286 via the shared electrical bus 282. Electrical machines operating in voltage mode may supply current to batteries (energy sources or sinks 284).

At step 216, the thrust and power required are delivered to the aircraft and sensors provide feedback to the first controller (e.g., a FADEC controller) 256 and the second controller (e.g., a FADEC controller) 260. In aspects, the feedback can be used by the first controller (e.g., a FADEC controller) 256 and the second controller (e.g., a FADEC controller) 260 to fine-tune operations.

Referring now to FIG. 3, one example of a system for operating electrical machines is described. At step 302, a first mode to operate a first electrical machine and a second mode to operate a second electrical machine are determined, for example, by a controller such as a FADEC controller. The first electrical machine is coupled to a first shaft of an engine and the second electrical machine is coupled to a second shaft of an engine.

Voltage mode is typically assigned to the electric machine with the greatest capacity for holding electrical bus voltage. This assignment could mean the electrical machine is sized larger than other motor-generator systems. This could also mean that the selected electrical machine is able to perform faster and/or at a more rapid rate.

Torque mode is typically assigned to the electric electrical machine (and associated shaft) where it is most beneficial for the engine controller to directly schedule. This assignment could be used to achieve the above steady-state and transient power split. This assignment can be used to satisfy constraints, both from the electric machines and from the engine. In aspects, torque mode is deterministic meaning that all possible values of the torque mode setpoint are bound within a predetermined operating space or range.

In examples, a first engine shaft supplies mechanical power to the first electrical machine operating in a first or torque mode. Electrical power is supplied to the aircraft and to the second electrical machine on the second shaft of the engine in a second or voltage mode. However, this is not encompassing of the operation of the torque mode. For instance, the electrical machine operating in torque mode could, at sometimes also generate power, instead of consuming power. Also, an electrical machine operating in voltage mode could be consuming power as opposed to generating power, if another electrical machine operating in torque mode is generating power.

At step 304, the first electrical machine is operated according to the first mode and the second electrical machine is operated according to the second mode.

At step 306, a power split of operation of the first electrical machine and the second electrical machine is determined. The aspects, the power split is set according to desired steady-state power split (shaft power extraction) and is first set based on optimal efficiency of the engine. The exact power split may be obtained using at table look up as a function of operating condition such as aircraft altitude, Mach (speed), or temperature. The power split can also be selected using an embedded model (e.g., mathematical or machine learning model) that is capable of estimating turbomachinery efficiency. Splitting power extraction/injection between shafts allows for migration along component maps. In aspects, the transient power split is set based on desired improved transient performance (e.g., faster acceleration/ deceleration) or improved operability margin. This power split may be set using a table look-up scheduled as a function of throttle plus the operating condition.

At step 308, the operation of the first electrical machine and the second electrical machine is controlled according to the power split. The power split is optimized to protect operating constraints of the engine and the safety of aircraft components while delivering required thrust to the engine.

Figure 4:
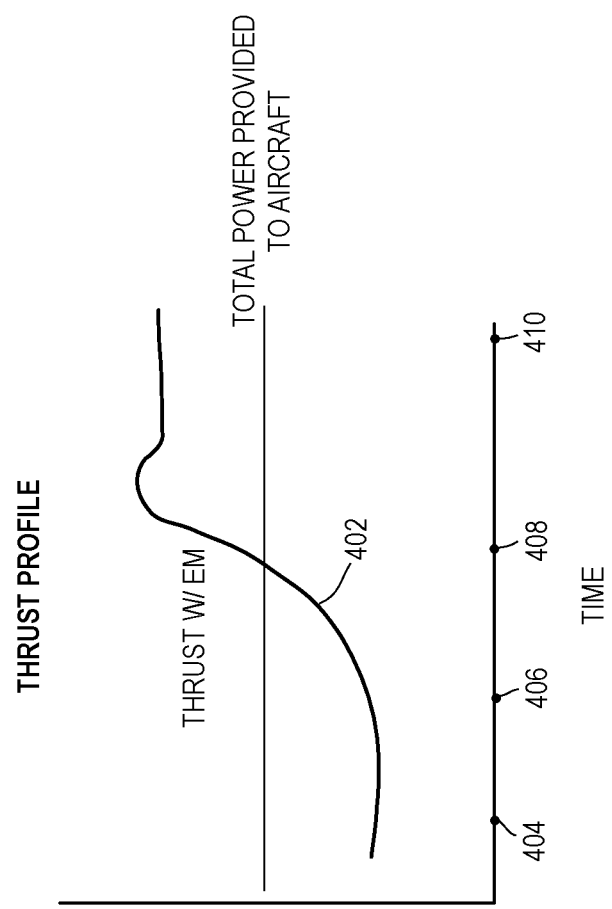
FIG. 4 comprises a diagram as configured in accordance with various embodiments of these teachings.
Figure 5:
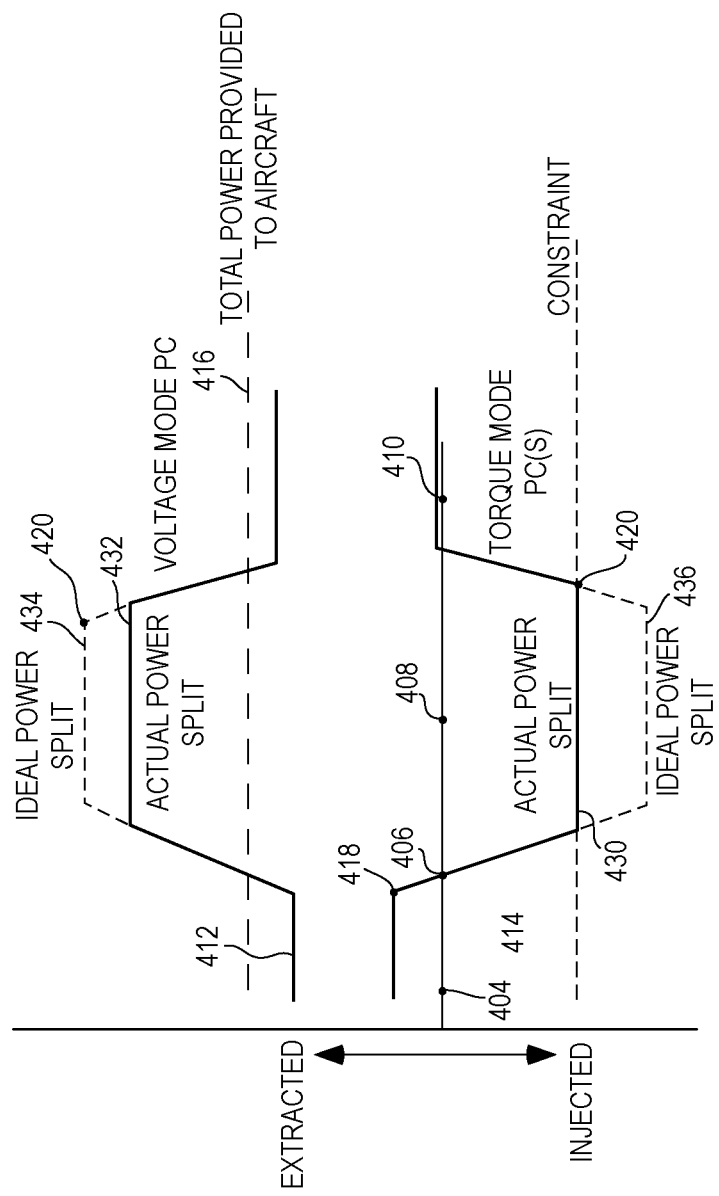
FIG. 5 comprises a diagram as configured in accordance with various embodiments of these teachings.

Referring now to FIG. 4 and FIG. 5, two graphs describing illustrative embodiments of the invention are described. These graphs show how the two electrical machines are operated.

FIG. 4 shows a line 402 representing the thrust needed from an electrical machine, and a line labeled 416 indicates the total amount of power needed or requested by the aircraft.

Time 1 (indicated by the lead line labelled 404) is the time at which a steady state power is provided to the aircraft before the thrust is requested (e.g., by the pilot).

Time 2 (indicated by the lead line labelled 406) is the time at which thrust is requested (for example, by a pilot) for an amount of thrust so that the aircraft can take off. To increase the acceleration capacity, a controller (e.g., a FADEC controller) commands torque injection into a designated engine shaft using electrical machines configured to operate in torque mode and letting voltage mode-configured electrical machines maintain a shared bus voltage (which supplies power to other aircraft systems. Constraints on the engine (e.g., operational constraints related to temperature or pressure) limit the amount of torque that can actually be applied to the engine(s). Other limits include rate limits (e.g., rate limiting torque), maximum electric machine torque (e.g., being a function of speed), other engine operability limits, electric machine drivetrain mechanical constraints (e.g., maximum gearbox torque or power output), or leader-follower constraint (e.g., a leader electrical machine demand respects constraints of a follower electrical machine). Other examples are possible.

A power split specifying torque amounts to be created is determined using torque mode for some electrical machines and voltage mode electrical machines. In other words, an amount of torque is supplied by the torque mode electrical machines (within limits set by operating constraints) while the voltage mode electrical machines maintain the shared electrical bus voltage at a constant or substantially constant value.

Time 3 (indicated by the lead line labelled 408) is the time when the requested thrust is being supplied to the aircraft engine(s).

Time 4 (indicated by the lead line labelled 410) is a point in time when a new constant power is being provided to the aircraft and the aircraft has taken off.

FIG. 5 shows the power split between the two electrical machines showing power (extracted or inserted) on the y-axis and time on the x-axis.

The top line 412 shows power associated with a first electrical machine and a bottom line 414 shows power associated with a second electrical machine. A line 416 indicates the total power provided to the aircraft.

At Time 1 (indicated by the lead line labelled 404) power is being drawn from the engine by the first electrical machine and the second electrical machine. At time (indicated by the line labeled 418) the second electrical machine supplies less power until at time 406 when it crosses the x-axis so that power in the form of torque is being supplied to the engine. It can be seen that the first electrical machine supplies more electricity to the power bus so that the overall power stays the same.

The second electrical machine supplies torque to the engine from time 406 (the time when thrust is requested for example by a pilot requesting thrust so that the aircraft is taking off) until time 418 until the maximum power 430 from this torque is achieved. Similarly, the first electrical machine continues to supply power to the power bus until this maximum power 432 is reached. At time 408, the maximum powers are being supplied (to the electrical bus for the first electrical machine) and torque to the eying (for the second electrical machine).

Lines 434 and 436 are ideal maximum powers but have been lowered because of operating constraints of the engine.

At time 420, the second electrical machine is operated to supply less torque because the engine needs less torque. Similarly, the first electrical machine supplies less power to the power bus.

Time 410 is a point in time when a new constant power is provided to the aircraft. The aircraft is taken off and requires no additional thrust. It can be seen that the first electrical machine is supplying more power at time 4 that time 1 after the process has been completed.

Figure 6:
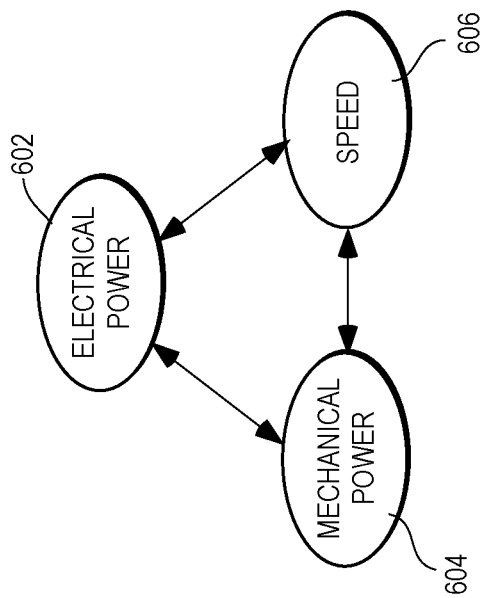
FIG. 6 comprises a diagram as configured in accordance with various embodiments of these teachings.

Referring now to FIG. 6, a state machine of an electrical machine is described. In this example, the electrical machine operates between an electrical power state 602, a mechanical power state 604, and a speed state 606. The electrical machine may operate to maintain a bus voltage, provide power to the engine, or control to a specific speed. In the electrical power state 602, electrical power is provided to aircraft systems. In the mechanical power state 604, torque is provided to the shaft of the engine to provide additional power to the engine. In the speed state 606, the operation of the electrical machine is controlled so that the engine operates at a specific speed. It can be seen that the approaches described elsewhere herein will cause a particular electrical machine to operate according to these states. In one example, at takeoff the aircraft may enter the mechanical power state 604 and this may transition to the electrical power state 602 to provide power to aircraft systems and to the speed state 606 to maintain a speed after takeoff.

Advantageously, the approaches provided herein are agnostic to electric architectures that choose to have an integrated battery or other external power source. These approaches meet the increasing electric power consumption demands of the engine and the aircraft while minimizing impact to primary control of the engine. Further, these approaches provide deterministic power transfer and power split scheduling for better propulsion system efficiency. The approaches provided herein provide improved transient capability and operability by integrating engine and electric machine power management. The present approaches improve time on the wing of the engine due to reducing cycle temperature and improve thrust control due to disturbance rejection logic of electrical power demands.

It should be understood that the controllers (e.g., the controller 102) provided herein may implement the various functionality described herein. In terms of hardware architecture, such a controller can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in a memory. The processor can be a custom made or commercially available processor, a central processing unit (CPU), an auxiliary processor among several processors associated with the computing device, a semiconductor-based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The controllers may implement the functions described herein in any combination of hardware and software (e.g., with the software being executed by a controller). The software may be stored in any memory device and may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a controller such as a microprocessor. However, as mentioned, these approaches can be implemented as any combination of electronic hardware and/or software.

Further aspects of the invention are provided by the subject matter of the following clauses:

A system, the system comprising: a first electrical machine coupled to a first shaft of an engine of an aircraft; a second electrical machine coupled to a second shaft of the engine of the aircraft; a controller coupled to the first electrical machine and the second electrical machine, the controller configured to: determine a first mode to operate the first electrical machine and a second mode to operate the second electrical machine, and operate the first electrical machine according to the first mode and the second electrical machine according to the second mode; determine a power split of operation of the first electrical machine and the second electrical machine; control an operation of the first electrical machine and the second electrical machine according to the power split of operation, the power split of operation being managed to protect operating constraints of the engine while meeting electrical power demands of the aircraft, while also maintaining desired engine thrust to the aircraft.

The system of any preceding clause, wherein the first engine shaft supplies mechanical power to the first electrical machine operating in the first mode and electrical power is supplied to the aircraft and to the second electrical machine on the second shaft of the engine The system of any preceding clause, wherein the second mode comprises a torque mode in which the second electrical machine supplies power to the engine.

The system of any preceding clause, wherein the power split of operation is determined according to a table.

The system of any preceding clause, wherein operating conditions of the aircraft are applied to the table to obtain the power split of operation.

The system of any preceding clause, wherein the power split of operation is determined by a model.

The system of any preceding clause, wherein the first mode and the second mode are selected based on characteristics of the first electrical machine and the second electrical machine.

The system of any preceding clause, wherein the aircraft components comprise aircraft instruments.

The system of any of the preceding cause, wherein the first electrical machine or the second electrical machine provide electrical power to aircraft instruments.

The system of any preceding clause, wherein the desired engine thrust is received from a cockpit system operated by a pilot.

A method of operating electrical machine associated with an aircraft engine, the method comprising: determining a first mode to operate a first electrical machine and a second mode to operate a second electrical machine, the first electrical machine coupled to a first shaft of an engine of an aircraft and the second electrical machine coupled to a second shaft of the engine of the aircraft; operating the first electrical machine according to the first mode and the second electrical machine according to the second mode; determining a power split of operation of the first electrical machine and the second electrical machine; controlling an operation of the first electrical machine and the second electrical machine according to the power split of operation, the power split of operation being managed to protect operating constraints of the engine while meeting electrical power demands of the aircraft, while maintaining desired engine thrust to the aircraft.

The method of any preceding clause, wherein the first engine shaft supplies mechanical power to the first electrical machine operating in the first mode and electrical power is supplied to the aircraft and to the second electrical machine on the second shaft of the engine.

The method of any preceding clause, wherein the second mode comprises a torque mode in which the second electrical machine supplies power to the engine.

The method of any preceding clause, wherein determining the power split of operation utilizes a table.

The method of any preceding clause, wherein operating conditions of the aircraft are applied to the table to obtain the power split of operation.

The method of any preceding clause, wherein determining the power split of operation utilizes a model.

The method of any preceding clause, wherein the first mode and the second mode are selected based on characteristics of the first electrical machine and the second electrical machine.

The method of any preceding clause, wherein the first electrical machine or the second electrical machine provide electrical power to aircraft instruments.

The method of any of the preceding clause, wherein the aircraft components comprise aircraft instruments of the aircraft.

The method of any preceding clause, further comprising receiving the desired engine thrust from a cockpit system operated by a pilot.

A non-transitory, machine-accessible storage medium having computer instructions and wherein the instructions are configured, when executed by a controller, to cause the controller to: determine a first mode to operate a first electrical machine and a second mode to operate a second electrical machine, the first electrical machine coupled to a first shaft of an engine of an aircraft and the second electrical machine coupled to a second shaft of the engine of the aircraft; operate the first electrical machine according to the first mode and the second electrical machine according to the second mode; determine a power split of operation of the first electrical machine and the second electrical machine; control an operation of the first electrical machine and the second electrical machine according to the power split of operation, the power split of operation being managed to protect operating constraints of the engine while meeting electrical power demands of the aircraft, while maintaining desired engine thrust to the aircraft.

The non-transitory, machine-accessible storage medium of any preceding clause, wherein the first engine shaft supplies mechanical power to the first electrical machine operating in the first mode and electrical power is supplied to the aircraft and to the second electrical machine on the second shaft of the engine.

The non-transitory, machine-accessible storage medium of any preceding clause, wherein the second mode comprises a torque mode in which the second electrical machine supplies power to the engine.

The non-transitory, machine-accessible storage medium of any preceding clause, wherein determining the power split of operation utilizes a table.

The non-transitory, machine-accessible storage medium of any preceding clause, wherein operating conditions of the aircraft are applied to the table to obtain the power split of operation.

The non-transitory, machine-accessible storage medium of any preceding clause, wherein determining the power split of operation utilizes a model.

The non-transitory, machine-accessible storage medium of any preceding clause, wherein the first mode and the second mode are selected based on characteristics of the first electrical machine and the second electrical machine.

The non-transitory, machine-accessible storage medium of any preceding clause, wherein the first electrical machine or the second electrical machine provide electrical power to aircraft instruments.

The non-transitory, machine-accessible storage medium of any of the preceding clause, wherein the aircraft components comprise aircraft instruments of the aircraft.

The non-transitory, machine-accessible storage medium of any preceding clause, wherein the instructions are further configured, when executed by the controller, to cause the controller to receive the desired engine thrust from a cockpit system operated by a pilot.

Those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A system, the system comprising:
   a first electrical machine coupled to a first shaft of an engine of an aircraft;
   a second electrical machine coupled to a second shaft of the engine of the aircraft;
   an electrical bus coupled to aircraft instruments; and
   a controller coupled to the first electrical machine and the second electrical machine, the controller configured to:
   automatically determine a first mode to operate the first electrical machine and a second mode to operate the second electrical machine, and operate the first electrical machine according to the first mode and the second electrical machine according to the second mode;
   wherein the first mode is a torque mode and the second mode is a voltage mode, the torque mode imparting mechanical power to the first shaft or the second shaft, the voltage mode utilizing a current to maintain a voltage at the electrical bus;
   wherein the voltage mode is assigned by the controller to the first electrical machine or the second electrical machine based upon a size of the first electrical machine or the second electrical machine;
   determine a power split of operation of the first electrical machine and the second electrical machine;
   wherein the power split specifies the total power to be maintained at the electrical bus and how much of the total power is to be supplied or drawn by each of the first electrical machine and the second electrical machine, the power split automatically changing over time;
   wherein the controller controls an operation of the first electrical machine and an operation of the second electrical machine according to the power split of operation, the power split of operation being managed to protect operating constraints of the engine while meeting electrical power demands of the aircraft instruments coupled to the electrical bus, while also maintaining desired engine thrust to the aircraft;
   wherein the controller operates the first electrical machine such that as torque demand changes, the first electrical machine operates so that a torque produced by the first electrical machine is equal to a torque specified in the power split up to a constraint, causing a resultant change in voltage on the electrical bus, and
   wherein the controller responsively operates the second electrical machine to cause the electrical bus to maintain the voltage on the electrical bus.

2. The system of claim 1, wherein the first shaft of the engine supplies mechanical power to the first electrical machine operating in the first mode and electrical power is supplied to the aircraft and to the second electrical machine on the second shaft of the engine.

3. The system of claim 1, wherein the power split of operation is determined according to a table.

4. The system of claim 3, wherein operating conditions of the aircraft are applied to the table to obtain the power split of operation.

5. The system of claim 1, wherein the power split of operation is determined by a model.

6. The system of claim 1, wherein the first mode and the second mode are further selected based on characteristics of the first electrical machine and the second electrical machine.

7. The system of claim 1, wherein the first electrical machine or the second electrical machine provide electrical power to the aircraft instruments.

8. The system of claim 7 wherein the aircraft instruments comprise environmental systems and communication systems.

9. The system of claim 1, wherein the desired engine thrust is received from a cockpit system operated by a pilot.

10. A method, the method comprising:
automatically determining a first mode to operate a first electrical machine and a second mode to operate a second electrical machine, the first electrical machine coupled to a first shaft of an engine of an aircraft and the second electrical machine coupled to a second shaft of the engine of the aircraft;
wherein the first mode is a torque mode and the second mode is a voltage mode, the torque mode imparting mechanical power to the first shaft or the second shaft, the voltage mode utilizing a current to maintain a voltage at an electrical bus;
wherein the voltage mode is assigned to the first electrical machine or the second electrical machine based upon a size of the first electrical machine or the second electrical machine;
operating the first electrical machine according to the first mode and the second electrical machine according to the second mode and operating an electric bus that is coupled to aircraft instruments;
determining a power split of operation of the first electrical machine and the second electrical machine, wherein the power split specifies a total power to be maintained at the electrical bus and how much of the total power is to be supplied or drawn by each of the first electrical machine and the second electrical machine, the power split automatically changing over time;
and
controlling an operation of the first electrical machine and the second electrical machine according to the power split of operation, the power split of operation being managed to protect operating constraints of the engine while meeting electrical power demands of the aircraft instruments coupled to the electrical bus, while maintaining desired engine thrust to the aircraft;
wherein the controlling comprises operating the first electrical machine such that as torque demand changes, the first electrical machine operates so that a torque produced by the first electrical machine is equal to a torque specified in the power split up to a constraint, causing a resultant change in voltage on the electrical bus, and responsively operating the second electrical machine to cause the electrical bus to maintain the voltage on the electrical bus.

11. The method of claim 10, wherein the first shaft of the engine supplies mechanical power to the first electrical machine operating in the first mode and electrical power is supplied to the aircraft and to the second electrical machine on the second shaft of the engine.

12. The method of claim 10, wherein determining the power split of operation utilizes a table.

13. The method of claim 12, wherein operating conditions of the aircraft are applied to the table to obtain the power split of operation.

14. The method of claim 10, wherein determining the power split of operation utilizes a model.

15. The method of claim 10, wherein the first mode and the second mode are further selected based on characteristics of the first electrical machine and the second electrical machine.

16. The method of claim 10, wherein the first electrical machine or the second electrical machine provide electrical power to the aircraft instruments.

17. The method of claim 16 wherein the aircraft instruments comprise environmental systems and communication systems.

18. A non-transitory, machine-accessible storage medium having computer instructions and wherein the instructions are configured, when executed by a controller, to cause the controller to:
automatically determine a first mode to operate a first electrical machine and a second mode to operate a second electrical machine, the first electrical machine coupled to a first shaft of an engine of an aircraft and the second electrical machine coupled to a second shaft of the engine of the aircraft;
wherein the first mode is a torque mode and the second mode is a voltage mode, the torque mode imparting mechanical power to the first shaft or the second shaft, the voltage mode utilizing a current to maintain a voltage at an electrical bus;
wherein the voltage mode is assigned by the controller to the first electrical machine or the second electrical machine based upon a size of the first electrical machine or the second electrical machine;
operate the first electrical machine according to the first mode and the second electrical machine according to the second mode and operate an electric bus that is coupled to aircraft instruments;
determine a power split of operation of the first electrical machine and the second electrical machine, wherein the power split specifies a total power to be maintained at the electrical bus and how much of the total power is to be supplied or drawn by each of the first electrical machine and the second electrical machine, the power split automatically changing over time;
and
control an operation of the first electrical machine and the second electrical machine according to the power split of operation, the power split of operation being managed to protect operating constraints of the engine while meeting electrical power demands of the aircraft instruments coupled to the electrical bus, while maintaining desired engine thrust to the aircraft;
wherein the controller operates the first electrical machine such that as torque demand changes, the first electrical machine operates so that a torque produced by the first electrical machine is equal to a torque specified in the power split up to a constraint, causing a resultant change in voltage on the electrical bus, and
wherein the controller responsively operates the second electrical machine to cause the electrical bus to maintain the voltage on the electrical bus.

* * * * *